United States Patent
Bauer

(10) Patent No.: US 11,128,436 B2
(45) Date of Patent: Sep. 21, 2021

(54) WHITE BOX AES IMPLEMENTATION

(71) Applicant: GIESECKE+DEVRIENT MOBILE SECURITY GMBH, Munich (DE)

(72) Inventor: Sven Bauer, Vaterstetten (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 359 days.

(21) Appl. No.: 16/316,689

(22) PCT Filed: Jul. 12, 2017

(86) PCT No.: PCT/EP2017/000830
§ 371 (c)(1),
(2) Date: Jan. 10, 2019

(87) PCT Pub. No.: WO2018/010843
PCT Pub. Date: Jan. 18, 2018

(65) Prior Publication Data
US 2019/0305930 A1    Oct. 3, 2019

(30) Foreign Application Priority Data
Jul. 12, 2016    (DE) .................. 10 2016 008 456.1

(51) Int. Cl.
*H04L 9/06* (2006.01)
*G06F 17/16* (2006.01)
*H04L 9/00* (2006.01)

(52) U.S. Cl.
CPC ............ *H04L 9/0631* (2013.01); *G06F 17/16* (2013.01); *H04L 9/002* (2013.01);
(Continued)

(58) Field of Classification Search
CPC ............. H04L 9/002; H04L 2209/0631; H04L 2209/16; H04L 2209/43
See application file for complete search history.

(56) References Cited

U.S. PATENT DOCUMENTS

2010/0080395 A1* 4/2010 Michiels ............... H04L 9/0631
380/278
2012/0254625 A1* 10/2012 Farrugia ................. G06F 21/52
713/189
(Continued)

FOREIGN PATENT DOCUMENTS

CA         2966417 A1    5/2016
WO     2016074775 A1    5/2016

OTHER PUBLICATIONS

Office Action from corresponding KR Application No. 10-2018-7036540, dated May 19, 2020.
(Continued)

*Primary Examiner* — Ellen Tran
(74) *Attorney, Agent, or Firm* — Workman Nydegger

(57) ABSTRACT

A processor device with a white-box masked implementation of the cryptographic algorithm AES implemented thereon, which comprises a SubBytes transformation. The white-box masked implementation is hardened in that white-box round input values x' are supplied at the round input of rounds instead of the round input values x, said white-box round input values being formed from a concatenation of: (i) the round input values x that are masked by means of the invertible masking mapping A and (ii) obfuscation values y that are likewise masked with the invertible masking mapping A; wherein from the white-box round input values x' only the (i) round input values x are fed to the SubBytes transformation T, and (ii) the masked obfuscation values y are not.

20 Claims, 3 Drawing Sheets

(52) U.S. Cl.
CPC .... *H04L 2209/04* (2013.01); *H04L 2209/043* (2013.01); *H04L 2209/16* (2013.01); *H04L 2209/24* (2013.01)

(56) References Cited

U.S. PATENT DOCUMENTS

| | | | |
|---|---|---|---|
| 2016/0323099 A1* | 11/2016 | Gorissen | H04L 9/0618 |
| 2017/0324542 A1 | 11/2017 | Drexler et al. | |
| 2017/0324543 A1 | 11/2017 | Drexler et al. | |
| 2017/0324547 A1 | 11/2017 | Drexler et al. | |
| 2017/0352298 A1 | 12/2017 | Drexler et al. | |

OTHER PUBLICATIONS

De Mulder, "White-Box Cryptography: Analysis of White-Box AES Implementations", Arenberg Doctoral School, Faculty of Engineering Science, Ku Leuven, 250 pages, Feb. 28, 2014.

Messerges, "Securing the AES Finalists Against Power Analysis Attacks", 1978, pp. 150-164. Fast Software Encryption, Springer-Verlag Berlin Heidelberg, as early as Dec. 31, 2001.

German Office Action from DE Application No. 102016008456.1, dated Jul. 5, 2017.

International Search Report from PCT Application No. PCT/EP2017/000830, dated Oct. 27, 2017.

"Announcing the Advanced Encryption Standard (AES)," Federal Information Processing Standards Publications 197, Nov. 26, 2001, 51 Pages.

Bos et al., "Differential Computation Analysis: Hiding your White-Box Designs is Not Enough," IACR Cryptology ePrint Archive, 2015, 22 Pages.

Chow et al., "White-Box Cryptography and an AES Implementation," Lecture Notes in Computer Science, vol. 2595, 2003, pp. 250-270.

Muir, "A Tutorial on White-Box AES," retrieved from https://eprint.iacr.org/2013/104.pdf, Feb. 22, 2013, 25 Pages.

Luo et al., "A New Attempt of White-Box AES Implementation," IEEE International Conference on Security, Pattern Analysis, and Cybernetics, Oct. 18, 2014, 423-429.

* cited by examiner

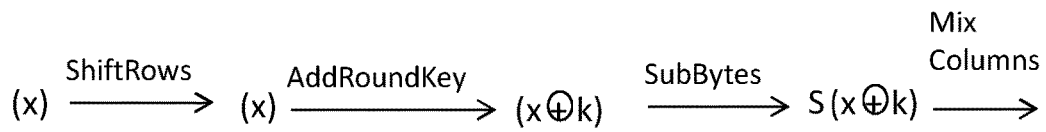
Prior art – middle AES round
Fig. 1
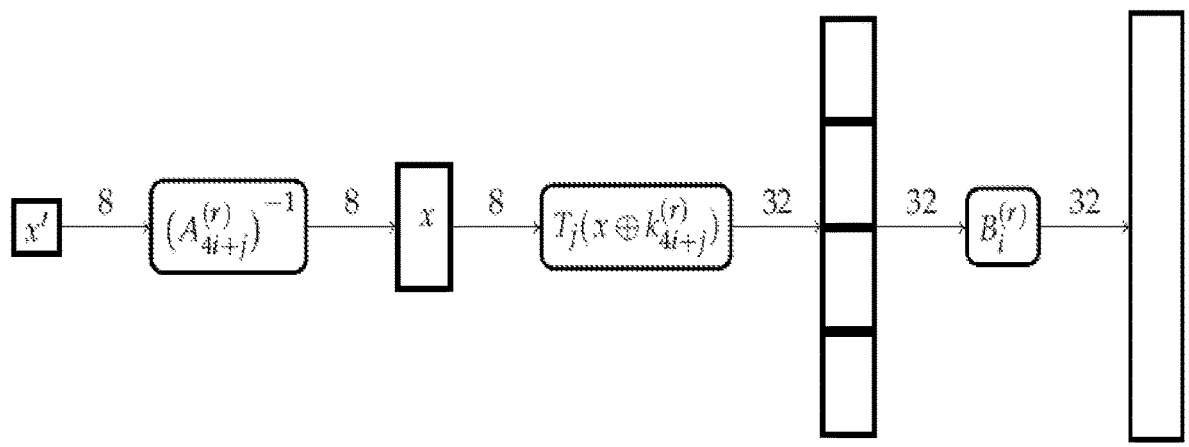
Prior art - [1] [Chow-AES]
Fig. 2
$$\left(A_0^{(0)} \| \ldots \| A_{15}^{(0)}\right)\left(k^{(0)} \oplus C^{-1}(x)\right) \qquad (11)$$
$$F_j(x') = D_j\left(S\left(\left(A_j^{(r)}\right)^{-1}(x)\right) \oplus k_j^{(r)}\right) \cdot 16 + \sigma_{j,x}^{(r)}(y)\right), \qquad (12)$$
Fig. 5

WHITE BOX AES IMPLEMENTATION

FIELD OF THE INVENTION

The invention relates to a white box implementation of the cryptographic algorithm AES (Advanced Encryption Standard). The invention more specifically relates to a processor device having a white box implementation of the cryptographic algorithm AES.

A processor device within the meaning of the invention is understood to mean a device or other object with a processor or an emulation of such a device on another device. Examples of devices are a mobile-communication capable terminal, a chip set for a mobile-communication capable terminal and a smart card. Examples of mobile-communication capable terminals are, on the one hand, mobile terminals such as smart phones and, on the other hand, M2M devices for an industrial environment. An example of a device on which an emulation of one of the first-mentioned devices is provided is a personal computer or PC, with an emulation for example of a mobile-communication capable terminal/smart phone, or of a smart phone chip set, etc. Thus, for example, an emulation of a chip set for a mobile-communication capable terminal or of a mobile-communication capable terminal or of a smart card on a PC is also regarded as a processor device.

In cryptographic algorithms security-critical data are processed, to which unauthorized persons are not to have access. For example, input data are processed to form output data by means of keys to be kept secret. In the traditional grey box cryptography, security-critical data are protected against access by unauthorized persons by storing the data in an environment to which unauthorized persons have theoretically no access. A perfectly access-protected environment would be secured by black box cryptography; inadequacies in a real implementation of the environment can, however, permit accesses, for which reason a real implementation of an access-protected environment is secured merely by grey box.

Authentication and encryption algorithms for mobile radio communication of a mobile terminal in a mobile communication network are currently implemented in a security element of the mobile terminal that is independent from point of view of hardware, for example a UICC (Universal Integrated Circuit Card) of the form factor plug-in or embedded. A plug-in UICC is understood to mean a removable (U)SIM card (SIM=Subscriber Identity Module, U=universal). An embedded UICC or eUICC is understood to mean a soldered-in module having otherwise identical functionality as a plug-in UICC. In the UICC, the security-critical data, in this case cryptographic keys, are also stored for the authentication and encryption algorithms. The future of security elements that are separate from point of view of hardware, such as plug-in UICCs or eUICCs, in mobile terminals is uncertain, and in the future there could also be mobile terminals without security element that is separate from point of view of hardware.

On mobile terminals additional applications are commonly stored, which go beyond the original field of application of telephony, and which likewise process security-critical data. The additional applications are typically stored as apps directly in a processor chip of the mobile terminal. There, the additional applications and their security-critical data are comparatively unprotected. Typical processor chips of a mobile terminal are a comparatively well-secured secure processor, an application processor which is provided above all for storing additional applications, and a baseband processor which is provided for the radio communication of the terminal in the mobile communication network. Additional applications such as apps are typically stored predominantly or entirely in the application processor.

If permitted by the UICC, additional applications and their security-critical data (e.g. keys) can be stored in the UICC. In particular, security-critical components of additional applications stored in the application processor can be moved out to the UICC, which has a higher security level than the application processor. The memory space in UICCs is relatively limited. In addition, some UICC do not permit the storage of additional applications or parts thereof in the UICC.

Examples of additional applications are payment applications for paying by means of the mobile terminal at a contactless (e.g. NFC-based) payment terminal. Furthermore, additional applications for cryptographic services such as, for example, voice encryption or data encryption, are increasingly used on mobile terminals such as e.g. smart phones. Cryptographic sub-tasks of the additional applications (e.g. also of payment applications) such as e.g. encryption, decryption, signature generation or signature verification are carried out by implementations of cryptographic algorithms.

PRIOR ART

In a white box implementation of a cryptographic algorithm, the approach is taken to conceal the security-critical data, in particular secret cryptographic keys, in the implementation such that an attacker who has full access ("total access") to the implementation is not in a position to extract the security-critical data from the implementation. White box cryptography is applicable and reasonable in particular for mobile terminals that do not have an independent security element, so that security-critical data are stored in a non-trustworthy environment.

The invention creates a solution for the cryptographic block cipher algorithm Advanced Encryption Standard AES, which is published in [3] [NIST-AES] NIST fips 197, "Announcing the ADVANCED ENCRYPTION STANDARD (AES)", Nov. 26, 2001. The AES comprises a number of Nr rounds. According to [3], chapter 5.1, a basis round of the AES comprises the four transformations SubBytes, ShiftRows, MixColumns and AddRoundKey. The last round differs slightly from the other rounds and contains, for example, no MixColumns transformation. The SubBytes transformation is a non-linear byte substitution, which is carried out employing a substitution table, called S-box. FIG. 1 shows a schematic representation of a middle AES round, i.e. a round that is not the first and not the last AES round, and that comprises the transformations ShiftRows, AddRoundKey, SubBytes and MixColumns. Input data x and key data k are processed here.

The technical article [2] [Chow-AES] S. Chow, P. Eisen, H. Johnson, P. C. van Oorschot, "*White-Box Cryptography and an AES Implementation*", in proceedings of the Ninth Workshop on Selected Areas in Cryptography (SAC 2002), pages 250-270, 2002, discloses, for an AES-128 with a key length of 128 bits and Nr=10 rounds, a white box implementation of the AES cryptographic algorithm in which the AES is implemented by key-dependent tables (lookup tables; cf. abstract). Furthermore, compositions of transformations are implemented in the tables instead of individual transformations (abstract). The AES is executed by a series of lookups, i.e. table calls, in the key-dependent tables. According to [2] chapter 3, start of chapter on page 6, the white box masking is achieved by composing each step in the AES algorithm with randomly selected bijections. According to [2] chapter 3.1, the key is accommodated in the S-box operation of the SubBytes transformation by employing key-dependent tables (lookup tables) or "T-boxes" of the construction principle T(x)=S(x XOR k), wherein x is an S-box input value, k is the key, S is the AES S-box and XOR is an XOR operation. Each T-box is thus a composition of an S-box and the preceding AddRoundKey transformation. For the concrete construction of the T-boxes, [2] chapter 4 and FIG. 1 specify four possibilities I-IV. In particular, in FIG. 1, an implementation of an AES round, is represented as type II in which round input values, which are fed to a T-box transformation of the round, are white-box masked by means of a bijective mapping ("8×8 mixing bijection").

FIG. 2 of the present application shows a possibility of realizing in a table call the white-box masked T-box indicated in [2] [Chow-AES], FIG. 1, type II. FIG. 2 shows, for an $r^{th}$ round of the AES, a mapping of a value x' by means of randomly selected bijection A(4i+j)(r) (the bijections are without designation in [2], chapter 3), key-dependent T-box Tj(x XOR k(4i+j)(r)) and permutation Bj(r), where j=0, . . . , 3. Diffusion is produced by the bijections A; confusion in the sense of cryptographic design criteria is produced by the permutations B.

In the technical publication [3] "Differential Computation Analysis: Hiding your White-Box Designs is Not Enough", J. W. Bos, Ch. Hubain, W. Michiels, and Ph. Teuwen, eprint.iacr.org/205/753, of the company NXP, and in the patent application 102014016548.5 of the applicant of the present application, two mutually similar test methods are disclosed, by which the secret key could be ascertained in each case from a white box implementation of a crypto-algorithm by using statistical methods. The AES white box implementation from [2] is also still susceptible to such attacks.

In the prior art [4] [DaemenRijmen] it is proposed to combine a SubBytes transformation with an AddRoundKey transformation to form combined tables $T'_j{}^{(r)}$ according to:

$$T'_0{}^{(r)}(x) = (k_0{}^{(r+1)}, k_1{}^{(r+1)}, k_2{}^{(r+1)}, k_3{}^{(r+1)}) \text{XOR } T_0(x);$$

$$T'_1{}^{(r)}(x) = (k_4{}^{(r+1)}, k_5{}^{(r+1)}, k_6{}^{(r+1)}, k_7{}^{(r+1)}) \text{XOR } T_1(x);$$

$$T'_2{}^{(r)}(x) = (k_8{}^{(r+1)}, k_9{}^{(r+1)}, k_{10}{}^{(r+1)}, k_{11}{}^{(r+1)}) \text{XOR } T_2(x);$$

$$T'_3{}^{(r)}(x) = (k_{12}{}^{(r+1)}, k_{13}{}^{(r+1)}, k_{14}{}^{(r+1)}, k_{15}{}^{(r+1)}) \text{XOR } T_3(x).$$

SUMMARY OF THE INVENTION

The object of the invention is to specify a processor device having a white box implementation of the cryptographic algorithm AES, which is specially hardened, so that as little as possible or no secret information can be yielded from the algorithm even by means of statistical methods applied to side channel outputs. In particular, special implementation details are to be specified by means of which a specially hardened implementation can be achieved.

The object is achieved by a processor device, as described herein. Advantageous embodiments of the invention are further specified.

On the processor device according to the invention an executable white-box masked implementation of the cryptographic algorithm AES is implemented. The AES comprises a plurality of rounds in which round output values are produced employing round input values x. Each round comprises an AddRoundKey transformation, in which the round key k is employed, and a SubBytes transformation T. The implementation is white-box masked, for which purpose at the round input of least one or of each round, masked round input values are supplied instead of the round input values x, said masked round input values having been produced in advance by applying an invertible masking mapping A to the round input values x.

The processor device according to the invention is characterized in that the white-box masked implementation is hardened. The hardening is effected by supplying at the round input of the at least one or of each round white-box round input values x'=(x|y) instead of the round input values x. These are formed from a concatenation x|y of: (i) the round input values x that are masked by means of the invertible masking mapping A and (ii) obfuscating values y that are likewise masked with the invertible masking mapping A. In this case, from the white-box round input values x'=(x|y) only the (i) round input values x will be fed to the SubBytes transformation T, but not the (ii) masked obfuscation values y. To the AES implementation, for example a table, thus values A(x')=A(x|y) are fed and processed there round by round.

As a result of feeding the obfuscation values y to the invertible masking mapping A in addition to the actually interesting round input values x, in statistical attacks an attacker will evaluate partly values that are based on computations with true round input values x, and partly values that are based on computations with obfuscation values y. Thus, the influence of the true round input values x is reduced substantially or, in the best case, even completely.

Therefore, a processor device is created that is specially hardened, so that as little as possible or no secret information can be yielded from the algorithm even by means of statistical methods applied to side channel outputs.

According to one embodiment of the invention, the implementation further comprises an unmasking transformation and a remasking transformation as additional transformations within a respective round By the unmasking transformation, the masked input values x in the round input values x' are transformed before the SubBytes transformation by means of a masking mapping $A^{-1}$ that is inverse to the masking mapping A such that the masking mapping A is reversed, i.e. such that non-masked round input values x are thus fed to the SubBytes transformation T. Thereby the true input values are processed by the non-linear SubBytes transformation. However, this does not mean that non-masked round input values x are actually present. Rather, the additional inverse masking mapping $A^{-1}$ will be integrated into a combined table, in which several transformations are combined. By the remasking transformation, the obfuscation values y in the round input values x' are remasked by the masking mapping A to form a random invertible mapping σ, so that obfuscation values y masked with the random invertible mapping σ are produced from the obfuscation values y masked with the masking mapping A. The original masking mapping A is generally fixedly predetermined for a longer period than the mapping σ.

According to one embodiment of the invention, further the round output of at least one or of each round is hardened in that a random invertible affine mapping B is applied at the round output of at least one or of each round. The mapping B is applied: (i) to the round input values x processed with at least the SubBytes transformation T and (ii) to the obfuscation values y—possibly masked with at least the random invertible mapping σ.

According to one embodiment of the invention, instead of the SubBytes transformation, a combined SubBytes transformation T can optionally be employed that is formed by a combination of a conventional AES SubBytes transformation S and an AES MixColumns transformation MC, according to T(x)=(MC) S(x).

According to a preferred embodiment of the invention, the affine mapping A is further configured such that each bit in the output values of the affine mapping A depends on at least one bit from the obfuscation values y, whereby it is achieved that the output values of the affine mapping A are statistically balanced. It is achieved thereby that output values of transformations (e.g. SubBytes transformations) are not correlated with output values as would be expected in unprotected implementations. Such a statistically balanced configuration of the mapping A is therefore particularly advantageous.

According to a special embodiment, the statistical balance is achieved by the masking mapping A being formed by a matrix A, in which invertible sub-matrices are supplied for the mapping of the obfuscation values y, wherein in each row of each sub-matrix supplied for obfuscation values y, at least one value has a value different from zero. As a result, no input values x remain which would be passed through the mapping without the influence of an obfuscation value y.

Optionally, the masking mapping A is formed by an invertible affine mapping. Alternatively, the masking mapping A is composed of one or several affine invertible mappings and one or several arbitrary invertible mappings, so that the masking transformation is invertible as a whole.

Optionally, the AES comprises a last round that does not comprise a MixColumns transformation, wherein in the last round a permutation D is additionally applied to: (i) output values of the SubBytes transformation or of the combined SubBytes transformation or of the AddRoundKey transformation; and (ii) obfuscation values y, which are possibly masked with the random invertible mapping σ.

According to a special embodiment of the invention, the AddRoundKey transformation is provided in the form of a key-dependent combined transformation $T^*(T(r)(4i+j)(x')$, j=0, 1, 2, 3; or: $S((A(r)j^{-1}(x) \text{ xor } kj(r))$; or: $A k^{(0)} \text{ xor } C^{-1}(x)$). In the key-dependent combined transformation $T^*$ there are combined: (i) in at least one or each middle AES round and in the last AES round, wherein middle rounds are understood to mean the rounds with the exception of the first and the last round, the AddRoundKey transformation, applied to output values of the, possibly combined, SubBytes transformation T (FIG. 3, formula (12)); or/and (ii) in the first AES round, the AddRoundKey transformation, applied to unmasked round input values x that are optionally processed by a permutation C, wherein the masking mapping A is applied to the output values of the AddRoundKey key transformation (formula (11)). The combinations (i), (ii) can be present individually or together. Preferably (i) and (ii) are both realized in order to accommodate the AddRoundKey transformation as required in all rounds of the AES.

Optionally, the output values of the, possibly combined, SubBytes transformation T are formed by four state bytes x=sj, j=0, 1, 2, 3, wherein the AddRoundKey transformation is applied only to some state bytes, but is not applied to all state bytes.

The key-dependent combined transformation specified in the last two paragraphs is represented by at least one key-dependent table according to embodiments of the invention. This table is implemented in the processor device. In order to execute the AES, table calls are executed in this table.

According to a further developed embodiment of the invention, the processor device further comprises a key update device which is adapted to replace the round key k in the key-dependent table by a new round key k' and to produce an updated key-dependent table thereby. In the practical application of an implementation of the AES on a processor device, it is desirable to have such a key update device.

The key update device is adapted according to embodiments to form differential key data from the round key, the new round key and one or several mappings employed for the white-box masking, in particular the mappings A or/and B or/and σ or/and C, and to form the updated key-dependent table by applying the differential key data to the key-dependent table. The table for the new round key can be efficiently computed by means of the differential key data, since it is not required to newly compute the complete table for the new round key from the start.

According to an efficiency-oriented embodiment, the AES is configured as an AES256 with a key length of 256 bits and comprises 14 rounds, wherein for the invertible affine mapping A applied to the round input values x, the same masking mapping A is employed in the rounds 9, 11 and 13 for the sake of efficiency. Alternatively, the AES is configured as an AES128 or AES192, wherein the same masking mapping A is employed in the corresponding suitable rounds.

BRIEF DESCRIPTION OF THE DRAWINGS

In the following the invention will be explained in more detail on the basis of embodiment examples and with reference to the drawing, in which there are shown:

FIG. 1 schematically a middle AES round according to the prior art;

FIG. 2 a possibility of realizing the white-box masked T-box indicated in [2] [Chow-AES], FIG. 1, type II in a table call;

FIG. 5 two formulas (11), (12) valid in some embodiments.

DETAILED DESCRIPTION OF EMBODIMENT EXAMPLES

Figure 3:
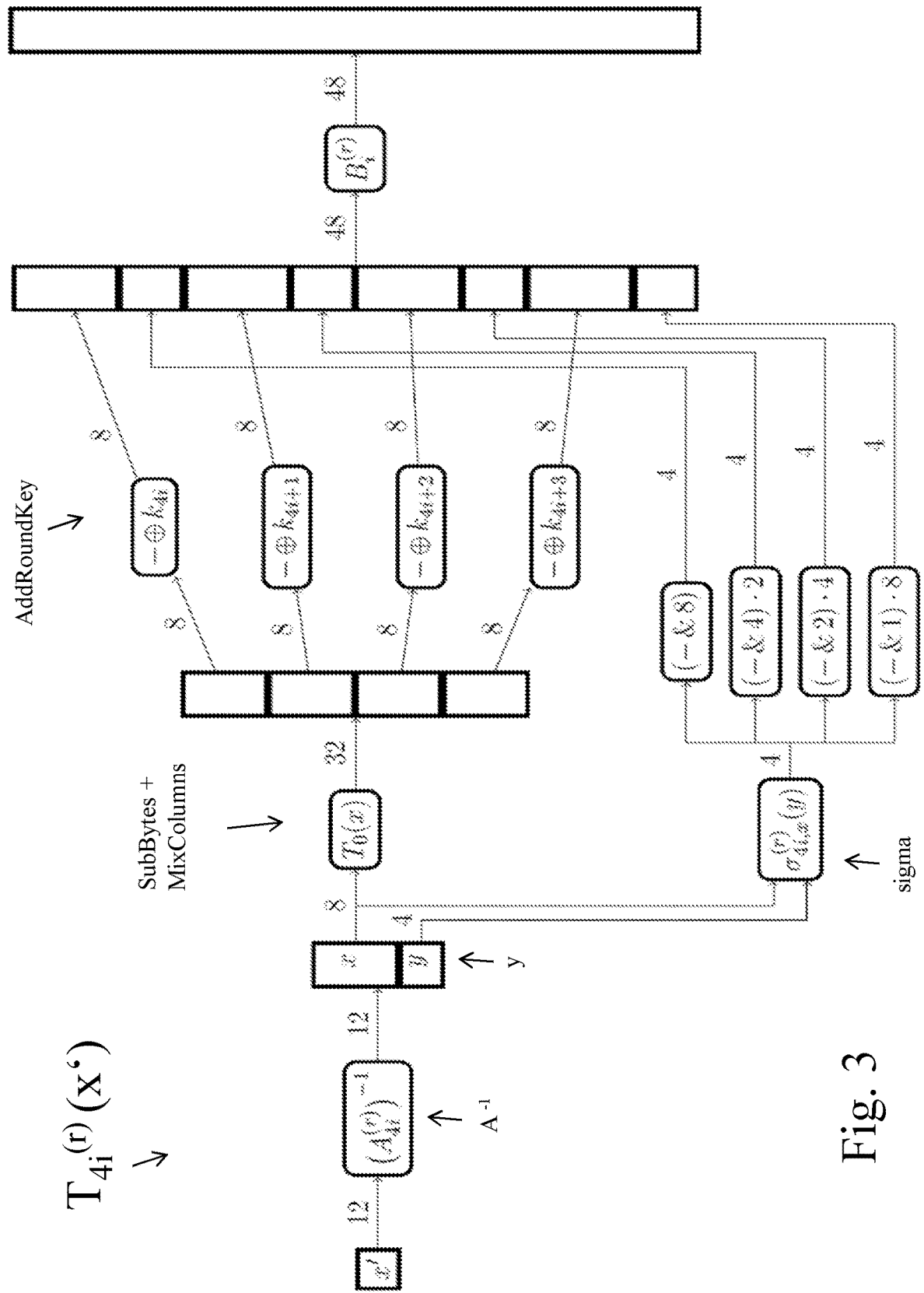
FIG. 3 one of four tables implementing the SubBytes, MixColumns and AddRoundKey operations of an AES round on state words with the indices 0, 4, 8, 12, according to an embodiment of the invention.
Figure 4:
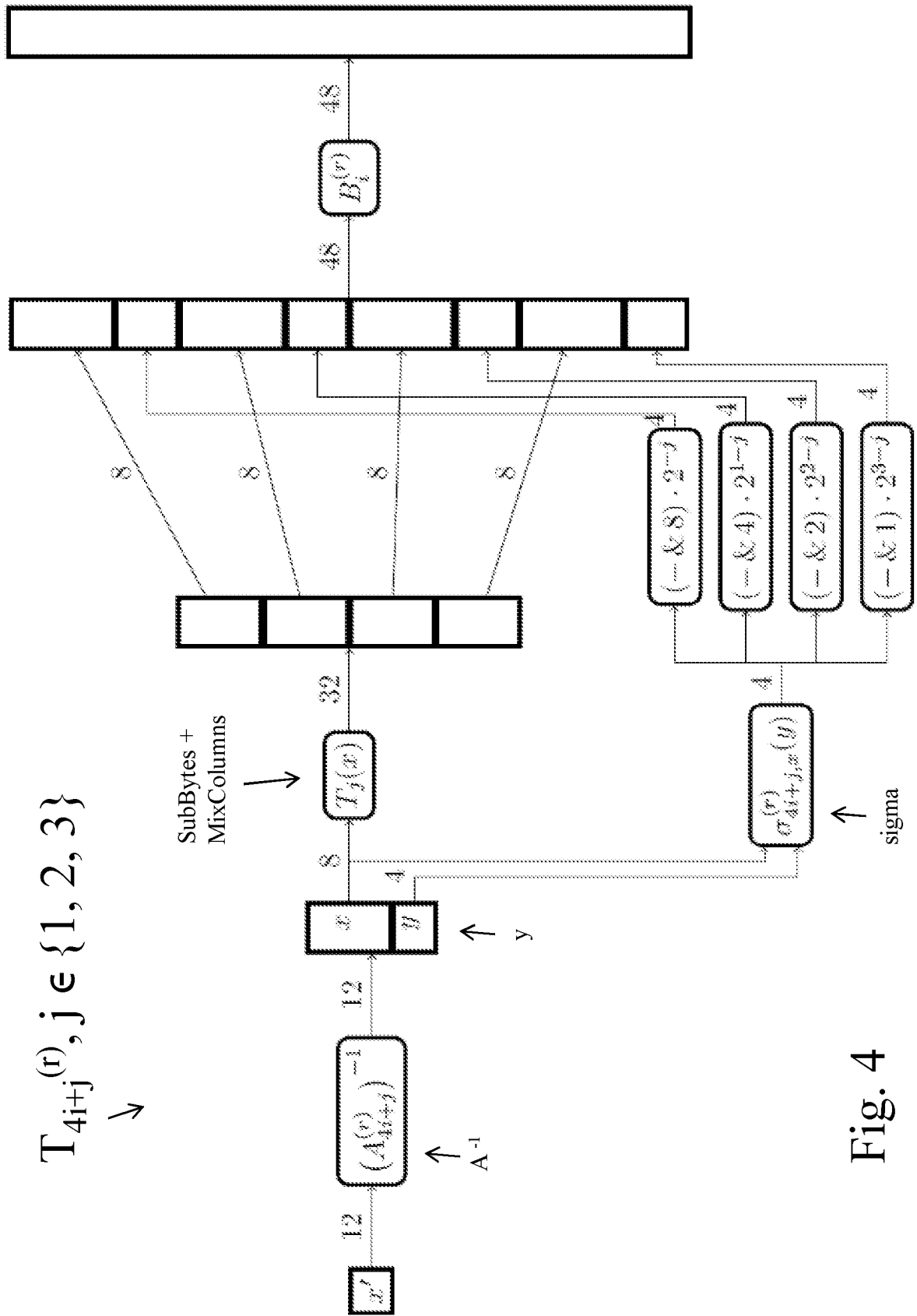
FIG. 4 the corresponding combined tables for the remaining twelve state word indices 1, 2, 3, 5, 6, 7, 9, 10, 11, 13, 14, 15.

FIG. 3 shows one of four tables implementing the SubBytes, MixColumns and AddRoundKey operations of an AES round on state words with the indices 0, 4, 8, 12. FIG. 4 shows the corresponding combined tables for the remaining twelve state word indices 1, 2, 3, 5, 6, 7, 9, 10, 11, 13, 14, 15. The round input values x of the respective AES round x are concatenated with obfuscation values y and masked with a masking mapping A. This operation results in input values x' for the mapping T and thus for the tables represented in FIG. 3 and FIG. 4. The masked and hardened AES implementation is thus formed by a mapping T, which is composed of the four tables represented in FIGS. 3 and 4, i.e. is composed of $T_{4i+1}^{(r)}(x')|T_{4i+2}^{(r)}(x')|T_{4i+3}^{(r)}(x')|T_{4i+4}^{(r)}(x')$, in connection with the input values x'.

There are three AES variants, namely with key lengths of 128 bits, 192 bits and 256 bits, which differ only in the number of rounds and the computation of the round keys. An implementation according to the invention is therefore possible for each of these key lengths.

FIG. 3 shows more precisely a combined transformation implemented by a table $T_{4i+1}^{(r)}(x')$, in which the transformations ShiftRows, SubBytes S, AddRoundKey and MixColumns are combined, and the obfuscation values y. The transformations SubBytes S and MixColumns of a round are combined to form a combined SubBytes transformation $T=T_0, T_1, T_2, T_3$ (i.e. the table T comprises four individual tables $T_0, T_1, T_2, T_3$), for example according to $T_0(x)=(02,01,02,03) S(x); T_1(x)=(03,02,02,01) S(x); T_2(x)=(01,03,02,01) S(x); T_3(x)=(01,01,03,02) S(x)$. The columns of the MixColumns transformation are represented by the four respectively four-element vectors (for greater ease of reading represented here in line form with commas) before the SubBytes transformations S. Each column in the result of the MixColumns/SubBytes transformation is the sum of the entries in the tables Tj, j=1, 2, 3, 4, for example according to:

$$T_0(s_0 \times k_0^{(r)}) \times T_1(s_5 \times k_5^{(r)}) \times T_2(s_{10} \times k_{10}^{(r)}) \times T_3(s_{15} \times k_{15}^{(r)}); \text{ with } X=\text{XOR}.$$

The masking mapping A itself is not represented in FIGS. 3 (and 4), merely the inverse masking mapping $A^{-1}$, with which the masking mapping A before the SubBytes transformation S, realized here as T in combination with MixColumns, is reversed again. The masking A is removed also from the obfuscation values y by means of the inverse masking mapping $A^{-1}$. The obfuscation values y unmasked thereby are masked again with the masking mapping sigma—optionally newly randomly determined for each time the AES is carried out—, so that a remasking is thus carried out from the long-term mask A to the mask sigma possibly randomly selected upon each AES execution. The mapping further comprises a transformation B in which the entries (i.e. the output values) of the combined SubBytes/MixColumns transformation Tj(x) are obfuscated.

According to FIG. 3, the input values $x'=A(x|y)$ are 12 bits in size. After unmasking with the inverse masking mapping $A^{-1}$, 8 bits of round input data and four bits obfuscation values y are present. After the combined SubBytes/MixColumns transformation Tj(x), 32 bits of transformed round input data x are present, which are split into four times 8 bits. The obfuscation values y are now merged with the transformed round input data x. The result of the merging is expanded to 48 bits by means of a transformation N.

The 48 bits now present provide the output material for the round input values of the next AES round.

FIG. 4 is structured analogously to FIG. 3, only with the difference that no round keys are incorporated.

The invention claimed is:

1. A processor device comprising:
one or more processors or an emulation of one or more processors,
wherein the one or more processors has an executable white box-masked implementation of a cryptographic algorithm AES implemented thereon that is hardened such that minimal or no secret information can be yielded from the cryptographic algorithm AES even by means of statistical methods applied to side channel outputs,
wherein the executable white box-masked implementation of the cryptographic algorithm AES comprises a plurality of rounds in which round output values are produced employing round input values x,
wherein each round comprises an AddRoundKey transformation in which the round key k is employed, and a SubBytes transformation T,
wherein the implementation is white-box masked such that, at the round input of at least one or of each round, masked round input values are supplied instead of the round input values x, said masked round input values having been produced in advance by applying an invertible masking mapping A to the round input values x,
wherein the white-box masked implementation is hardened in that at the round input of the at least one or of each round, white-box round input values x' are supplied instead of the round input values x, said white-box round input values being formed from a concatenation of:
(i) the round input values x that are masked by means of the invertible masking mapping A, and
(ii) obfuscation values y that are likewise masked with the invertible masking mapping A;
wherein from the white-box round input values x' only the (i) round input values x are fed to the SubBytes transformation T, and the (ii) masked obfuscation values y are not.

2. The processor device according to claim 1, wherein the implementation further comprises within a respective round:
an unmasking transformation of the masked input values x in the round input values x' before the SubBytes transformation by means of a masking mapping $A^{-1}$ that is inverse to the masking mapping A and that is adapted to feed non-masked round input values x to the SubBytes transformation T, and
a remasking transformation of the obfuscation values y in the round input values x' from the masking mapping A to a random invertible mapping σ that is adapted to produce obfuscation values y masked with the random invertible mapping σ from the obfuscation values y masked with the masking mapping A.

3. The processor device according to claim 1, wherein further the round output of at least one or of each round is hardened in that a random invertible affine mapping B is applied at the round output of at least one or of each round, specifically to:
(i) the round input values x processed with at least the SubBytes transformation T and
(ii) the obfuscation values y.

4. The processor device according to claim 1, wherein, instead of the SubBytes transformation, a combined SubBytes transformation T is employed that is formed by a combination of a conventional AES SubBytes transformation S and an AES MixColumns transformation MC, according to T(x)=(MC) S(x).

5. The processor device according to claim 1, wherein the affine mapping A is further configured such that each bit in the output values of the affine mapping A depends on at least one bit from the obfuscation values y, whereby it is achieved that the output values of the affine mapping A are statistically balanced.

6. The processor device according to claim 5, wherein the statistical balance is achieved in that the masking mapping A is formed by a matrix A, in which invertible sub-matrices are supplied for the mapping of the obfuscation values y,
wherein in each row of each sub-matrix supplied for obfuscation values y at least one value has a value different from zero.

7. The processor device according to claim 1, wherein the masking mapping A
- is formed by an invertible affine mapping; or
- is composed of one or several affine invertible mappings and one or several arbitrary invertible mappings, so that the masking transformation is invertible as a whole.

8. The processor device according to claim 1, wherein the AES comprises a last round that does not comprise a MixColumns transformation, and
   wherein in the last round a permutation D is additionally applied to:
   (i) output values of the SubBytes transformation or of the combined SubBytes transformation or of the AddRoundKey transformation; and
   (ii) obfuscation values y.

9. The processor device according to claim 1, wherein the AddRoundKey transformation is provided in the form of a key-dependent combined transformation $T^*(T(r)(4i+j)(x')$, $j=0, 1, 2, 3$; or: $S((A(r)j^{-1}(x)$ xor $kj(r))$; or: $A k^{(0)}$ xor $C^{-1}(x))$, in which there are combined:
   (i) in at least one or each middle AES round and in the last AES round, wherein middle rounds are understood to mean the rounds with the exception of the first and the last round, the AddRoundKey transformation, applied to output values of the, possibly combined, SubBytes transformation T; or/and
   (ii) in the first AES round, the AddRoundKey transformation, applied to non-masked round input values x optionally processed by a permutation C, wherein the masking mapping A is applied to the output values of the AddRoundKey transformation.

10. The processor device according to claim 9, wherein the output values of the, possibly combined, SubBytes transformation T are formed by four state bytes $x=sj$, $j=0, 1, 2, 3$, wherein the AddRoundKey transformation is applied only to some state bytes, but is not applied to all state bytes.

11. The processor device according to claim 9, comprising at least one key-dependent table, by means of which a table representation of the key-dependent combined transformation is formed.

12. The processor device according to claim 11, further comprising a key update device adapted to replace the round key k in the key-dependent table by a Previously Presented round key and to produce an updated key-dependent table thereby.

13. The processor device according to claim 12, wherein the key update device is adapted to form differential key data from the round key, the Previously Presented round key and one or several mappings employed for the white-box masking, in particular of the mappings A or/and B or/and σ or/and C, and to form the updated key-dependent table by applying the differential key data to the key-dependent table.

14. The processor device according to claim 9, wherein the AES is configured as an AES256 with a key length of 256 bits and comprises 14 rounds, and
   wherein for the invertible affine mapping A applied to the round input values x the same masking mapping A is employed in the rounds 9, 11 and 13, or alternatively as an AES128 or AES192 configured analogously to the AES256.

15. The processor device according to claim 1, wherein further the round output of at least one or of each round is hardened in that a random invertible affine mapping B is applied at the round output of at least one or of each round, specifically to:
   (i) the round input values x processed with at least the SubBytes transformation T and
   (ii) the obfuscation values y, which are masked with at least the random invertible mapping σ.

16. The processor device according to claim 1, wherein the AES comprises a last round that does not comprise a MixColumns transformation, and
   wherein in the last round a permutation D is additionally applied to:
   (i) output values of the SubBytes transformation or of the combined SubBytes transformation or of the AddRoundKey transformation; and
   (ii) obfuscation values y, which are masked with the random invertible mapping σ.

17. The processor device according to claim 1,
   wherein the implementation further comprises within a respective round:
      an unmasking transformation of the masked input values x in the round input values x' before the SubBytes transformation by means of a masking mapping $A^{-1}$ that is inverse to the masking mapping A and that is adapted to feed non-masked round input values x to the SubBytes transformation T, and
      a remasking transformation of the obfuscation values y in the round input values x' from the masking mapping A to a random invertible mapping σ that is adapted to produce obfuscation values y masked with the random invertible mapping σ from the obfuscation values y masked with the masking mapping A;
      and
   wherein further the round output of at least one or of each round is hardened in that a random invertible affine mapping B is applied at the round output of at least one or of each round, specifically to:
      (i) the round input values x processed with at least the SubBytes transformation T and
      (ii) the obfuscation values y.

18. The processor device according to claim 1,
   wherein the implementation further comprises within a respective round:
      an unmasking transformation of the masked input values x in the round input values x' before the SubBytes transformation by means of a masking mapping $A^{-1}$ that is inverse to the masking mapping A and that is adapted to feed non-masked round input values x to the SubBytes transformation T, and
      a remasking transformation of the obfuscation values y in the round input values x' from the masking mapping A to a random invertible mapping σ that is adapted to produce obfuscation values y masked with the random invertible mapping σ from the obfuscation values y masked with the masking mapping A;
      and
   wherein further the round output of at least one or of each round is hardened in that a random invertible affine mapping B is applied at the round output of at least one or of each round, specifically to:
      (i) the round input values x processed with at least the SubBytes transformation T and
      (ii) the obfuscation values y, which are masked with the random invertible mapping σ.

19. A method of executing a white box-masked implementation of a cryptographic algorithm AES implemented on a processor device comprising one or more processors or an emulation of one or more processors, the cryptographic algorithm AES being hardened such that minimal or no secret information can be yielded from the cryptographic algorithm AES even by means of statistical methods applied to side channel outputs, wherein executable white box-masked implementation of the cryptographic algorithm AES comprises a plurality of rounds in which round output values are produced employing round input values x, wherein each round comprises an AddRoundKey transformation in which the round key k is employed, and a SubBytes transformation T, wherein the implementation is white-box masked such that, at the round input of at least one or of each round, masked round input values are supplied instead of the round input values x, said masked round input values having been produced in advance by applying an invertible masking mapping A to the round input values x, wherein the white-box masked implementation is hardened in that at the round input of the at least one or of each round, white-box round input values x' are supplied instead of the round input values x, said white-box round input values being formed from a concatenation of:

(i) the round input values x that are masked by means of the invertible masking mapping A, and (ii) obfuscation values y that are likewise masked with the invertible masking mapping A;

wherein from the white-box round input values x' only the (i) round input values x are fed to the SubBytes transformation T, and the (ii) masked obfuscation values y are not.

20. One or more non-transitory computer-readable mediums having stored thereon executable instructions that when executed by one or more processors or an emulation of one or more processors of a processor device configure the processor device to perform a method of executing a white box-masked implementation of a cryptographic algorithm AES implemented on a processor device comprising one or more processors or an emulation of one or more processors, the cryptographic algorithm AES being hardened such that minimal or no secret information can be yielded from the cryptographic algorithm AES even by means of statistical methods applied to side channel outputs, wherein executable white box-masked implementation of the cryptographic algorithm AES comprises a plurality of rounds in which round output values are produced employing round input values x, wherein each round comprises an AddRoundKey transformation in which the round key k is employed, and a SubBytes transformation T, wherein the implementation is white-box masked such that, at the round input of at least one or of each round, masked round input values are supplied instead of the round input values x, said masked round input values having been produced in advance by applying an invertible masking mapping A to the round input values x, wherein the white-box masked implementation is hardened in that at the round input of the at least one or of each round, white-box round input values x' are supplied instead of the round input values x, said white-box round input values being formed from a concatenation of:

(i) the round input values x that are masked by means of the invertible masking mapping A, and (ii) obfuscation values y that are likewise masked with the invertible masking mapping A;

wherein from the white-box round input values x' only the (i) round input values x are fed to the SubBytes transformation T, and the (ii) masked obfuscation values y are not.

\* \* \* \* \*